United States Patent [19]
Thorland

[11] Patent Number: 5,471,489
[45] Date of Patent: Nov. 28, 1995

[54] MAGNETIC MEANS FOR SUPPRESSION OF LASING IN CERTAIN WAVELENGTHS IN A RING LASER GYRO

[75] Inventor: Rodney H. Thorland, Shoreview, Minn.

[73] Assignee: Honeywell Inc., Minneapolis, Minn.

[21] Appl. No.: 315,164

[22] Filed: Sep. 29, 1994

[51] Int. Cl.$^6$ .................................................. H01S 3/098
[52] U.S. Cl. .................................. 372/19; 372/37; 372/94
[58] Field of Search ................................... 372/19, 37, 94

[56] References Cited

U.S. PATENT DOCUMENTS

| | | | |
|---|---|---|---|
| 3,649,931 | 3/1972 | Macek | 372/94 |
| 4,246,549 | 1/1981 | Carter et al. | 372/94 |
| 4,667,162 | 5/1987 | Broberg et al. | 372/94 |
| 4,969,743 | 11/1990 | Cote et al. | 372/94 |
| 5,080,487 | 1/1992 | Martin | 372/94 |
| 5,196,905 | 3/1993 | Hahn et al. | 372/94 |
| 5,305,085 | 4/1994 | Hahn | 372/94 |
| 5,323,227 | 6/1994 | Martin | 372/94 |

Primary Examiner—Rodney Bovernick
Assistant Examiner—Robert E. Wise
Attorney, Agent, or Firm—Craig J. Lervick

[57] ABSTRACT

A magnetic device attached to a ring laser gyro is used to prevent undesirable operating conditions in a ring laser gyro. Undesirable operating conditions occur when the ring laser gyro operates at specific wavelengths. The magnetic device used with the ring laser gyro creates a magnetic field that suppresses the operation at those specific wavelengths so that the undesirable operating conditions are removed.

10 Claims, 6 Drawing Sheets

MAGNETIC MEANS FOR SUPPRESSION OF LASING IN CERTAIN WAVELENGTHS IN A RING LASER GYRO

BACKGROUND OF THE INVENTION

In ring laser gyros, the operating range of the wavelength of the lasing is an important feature to keep low loss and retain the gain in the ring laser gyro. Some ring laser gyros which use Helium-Neon as a gain medium, operate at a wavelength of 633 nm. However, under certain conditions in the pumping of the gain medium, lasing occurs at an undesirable wavelength. One such wavelength is 650 nm. Lasing at this wavelength causes unpredictable gyro bias shifts and gyro factor scale changes. Current methods of solving this problem have included limiting the 633 nm intracavity pumping to levels below the threshold of 650 nm. This creates the problem of low rate lockup performance and angular random walk.

SUMMARY OF THE INVENTION

The present invention discloses a means to suppress undesirable wavelengths in ring laser gyro operation. The present invention is a ring laser gyro having at least one gain leg, at least one cathode and anode and a magnet placed in close proximity to the gain leg. Two magnets are used in the preferred embodiment. A cathode and two anodes are also used in the preferred embodiment. The magnetic field suppresses the undesirable wavelengths such as 650 nm.

DETAILED DESCRIPTION OF THE PREFERRED EMBODIMENT

Figure 1:
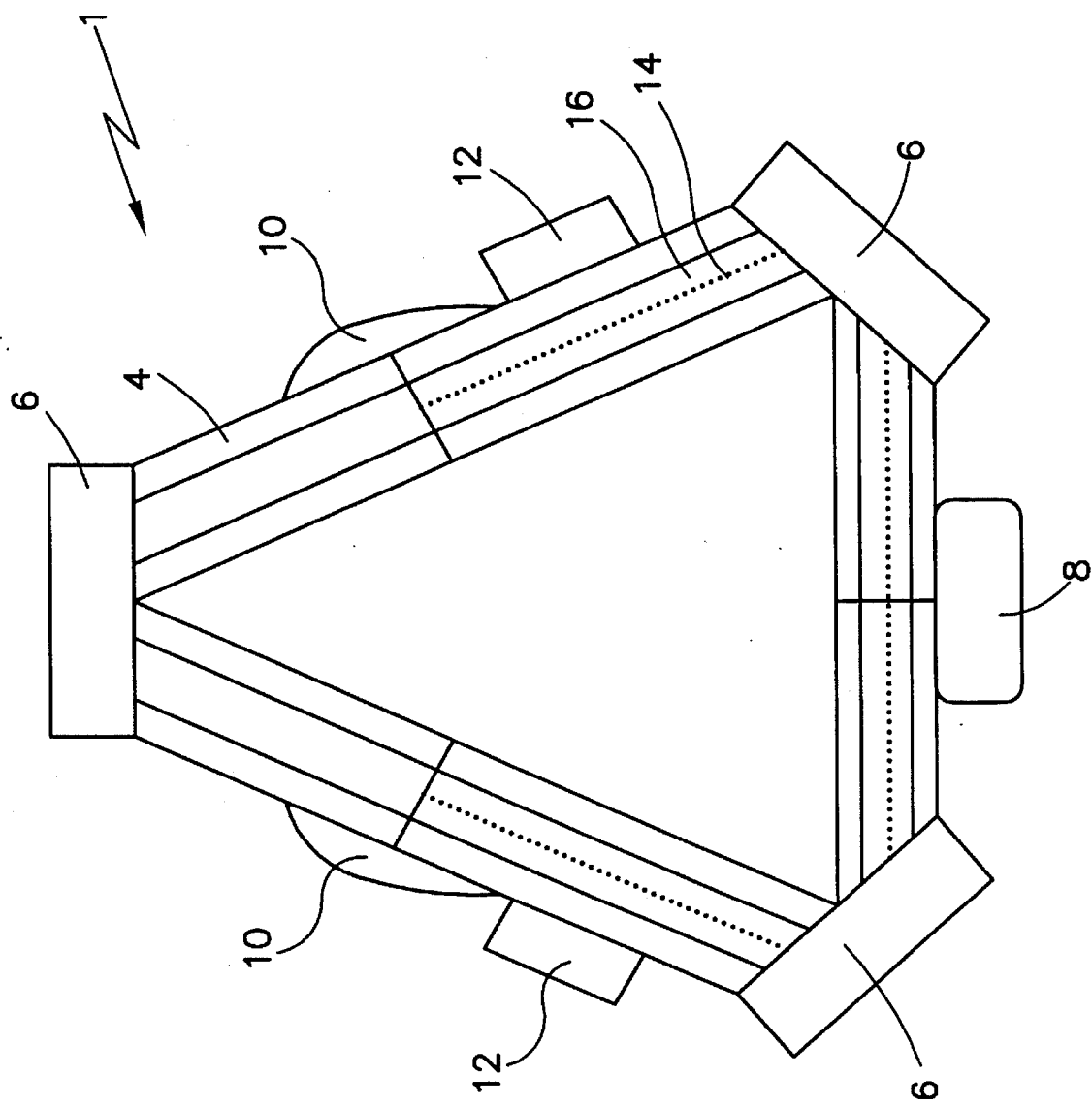
FIG. 1 shows a top view of a ring laser gyro with magnets placed on two sides of the ring laser gyro.

A ring laser gyro 1 (RLG) is shown in FIG. 1. The RLG of the preferred embodiment includes many elements. These elements are attached to the ring laser gyro block 4. The ring laser gyros 1 of the preferred embodiment are triangular shaped, Helium-Neon ring laser gyros about 6 inches in length. Three mirrors 6 are attached at the ends of the ring laser gyro 1. A cathode 8 is placed on one side of the ring laser gyro 1 opposite one of the mirrors 6. Anodes 10 are attached to the ring laser gyro 1 on the other two sides. Two magnets 12 are used in the preferred embodiment. The placement of these two magnets varies. The following figures will indicate many of the positions of the magnets. The magnets 12 can be placed anywhere near gain legs 14. The gain legs 14 are paths of discharge current. In a preferred embodiment, the magnets are placed 1/10 inch away from the interior gain bore 16.

In FIG. 1, one magnet 12 is placed on each side next to the anodes 10 on the two sides of the ring laser gyro 1. In a preferred embodiment, dipole Samarium Cobalt disc magnets are used. The magnets 12 are attached to the ring laser gyro block 4 with sealants. Any standard type of cement to attach objects to RLGs can be used.

Figure 2:
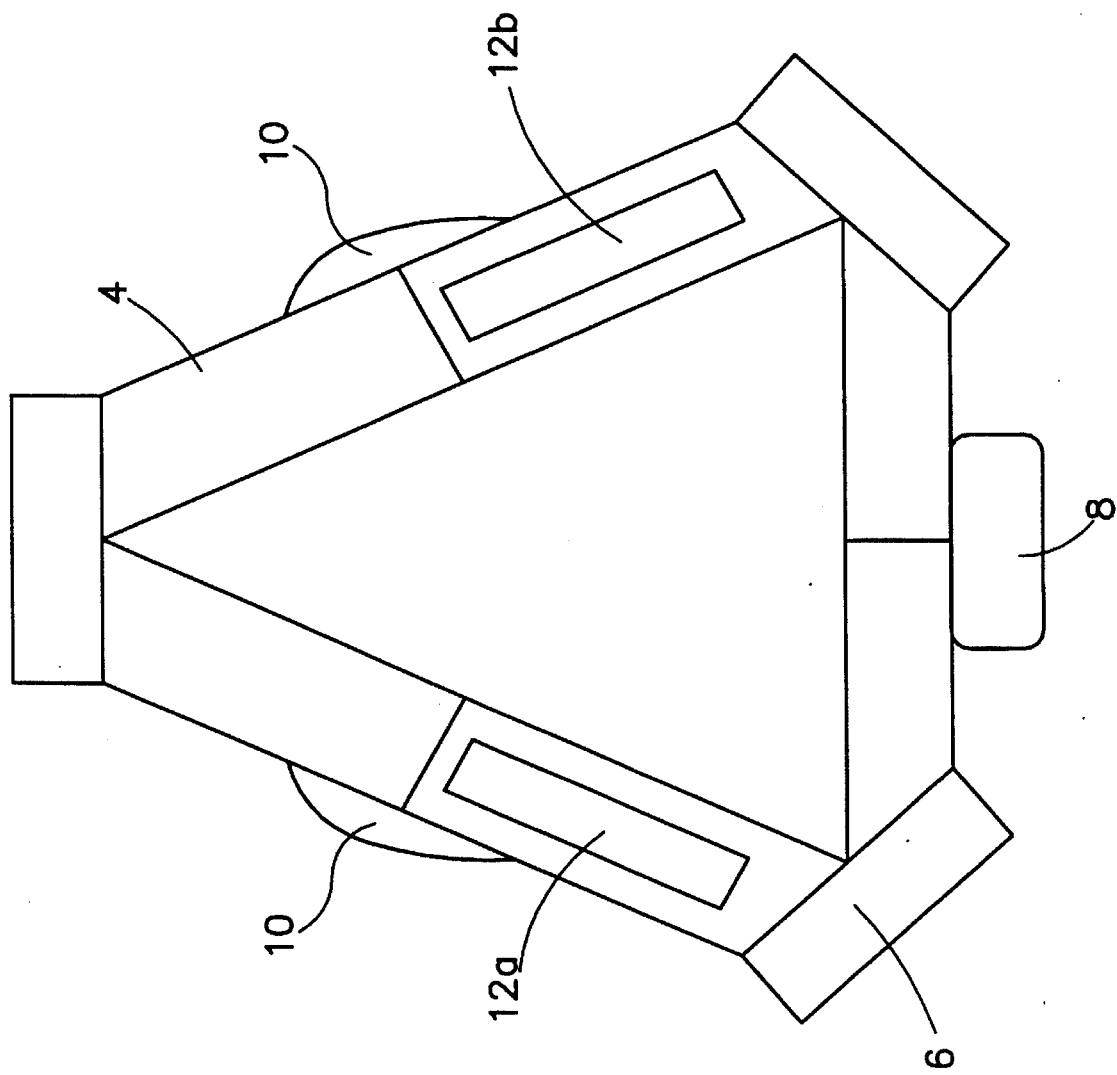
FIG. 2 shows a top view of a ring laser gyro with magnets placed on two sides of the ring laser gyro on top of the ring laser gyro.
Figure 3:
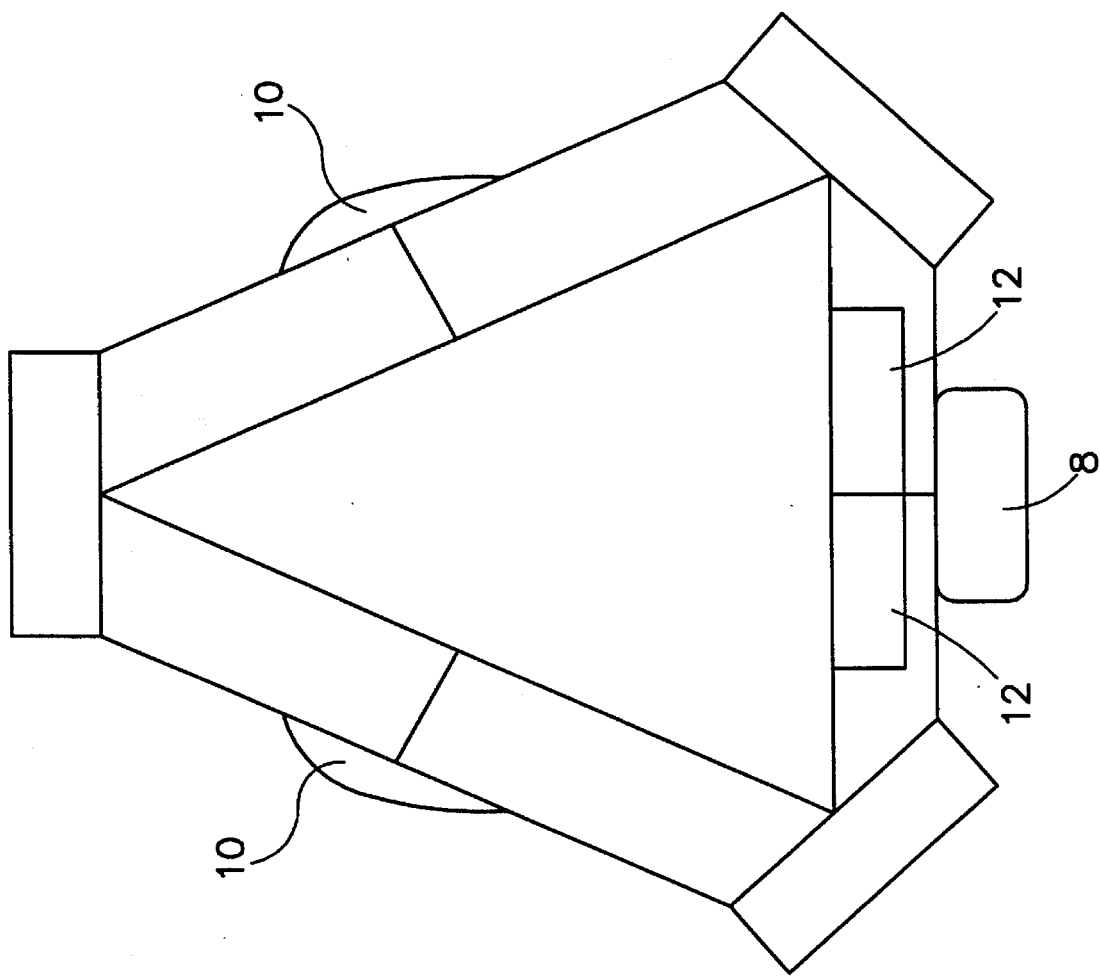
FIG. 3 shows a top view of a ring laser gyro with magnets placed on top of the ring laser gyro on one side of the ring laser gyro.

FIG. 2 depicts another embodiment of the present invention. The magnets 12 can be placed in a different area of the RLG block 4. One magnet 12a is placed on top of the RLG block 4 close to an anode 10a as seen in FIG. 2. The other magnet 12b is placed on top of the RLG block 4 close to the anode 10b on the other side of the RLG block 4. Yet another embodiment of the present invention can be seen in FIG. 3. In this embodiment, the magnets 12 are placed next to each other on top of the RLG block 4 close to the cathode 8.

Figure 4:
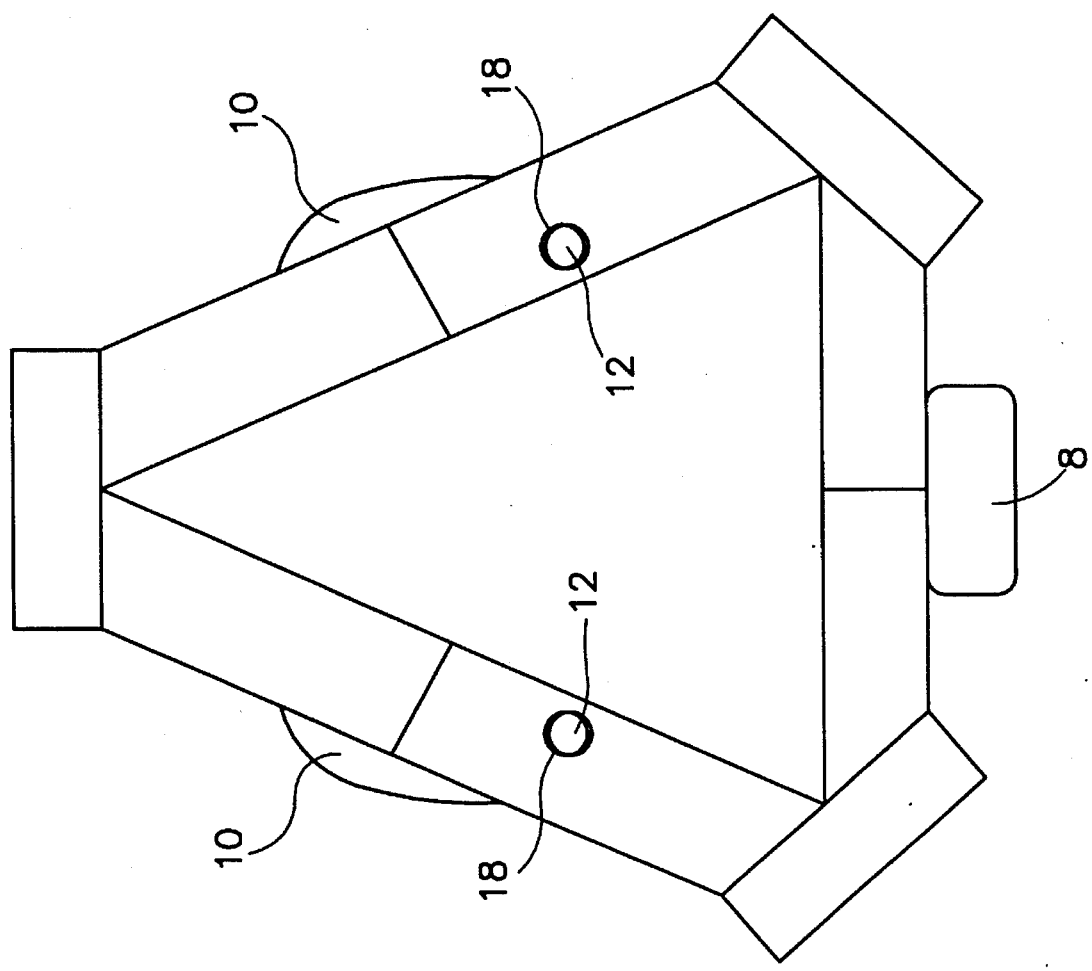
FIG. 4 and FIG. 5 show a ring laser gyro with magnets placed in the ring laser gyro block.
Figure 5:
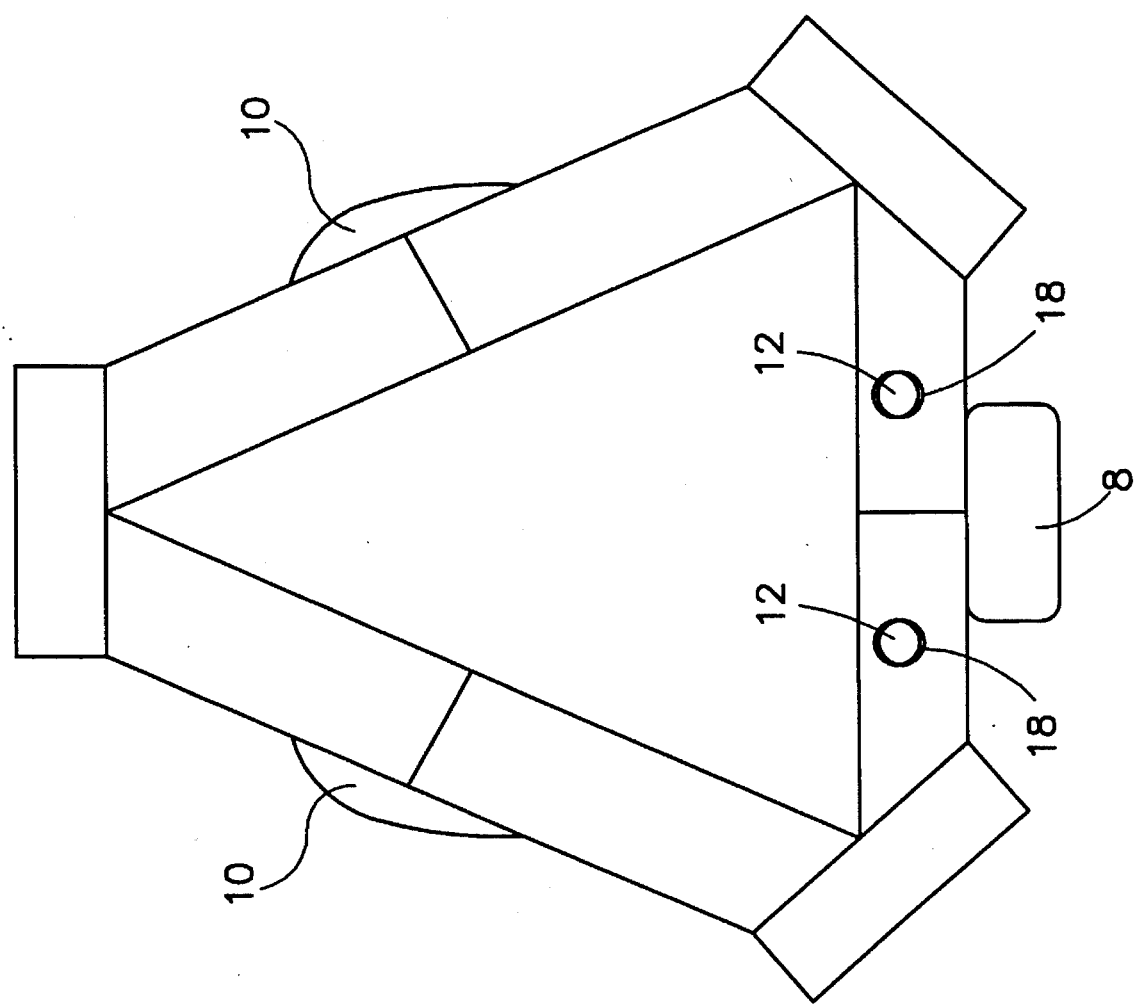

FIG. 4 and FIG. 5 show yet other embodiments of the present invention. Holes 18 can be machined through the RLG block 4. These holes 18 are machined in the same areas as the placement of the magnets in the previous FIGS. 2 and 3 respectively. Magnets 12 are then placed in these holes 18. In a preferred embodiment, the size of these magnets is approximately 0.25 inches in diameter. The size of the magnets will vary according to the size of the RLG.

The invention operates as follows. A current path is created in the RLG 1. Current from a power supply (not shown) is passed through the gain bore 16 from the cathode 8 to the anodes 10. Each current path through the gain bore 16 is called a gain leg 14. The magnets 12 are placed in close proximity to the gain legs 14 as depicted in the previous figures. By the very nature of magnets, a magnetic field is created by the magnets 12. The magnetic field 12 reduces the gain at the undesired wavelength while not affecting the desired wavelength.

Figure 6:
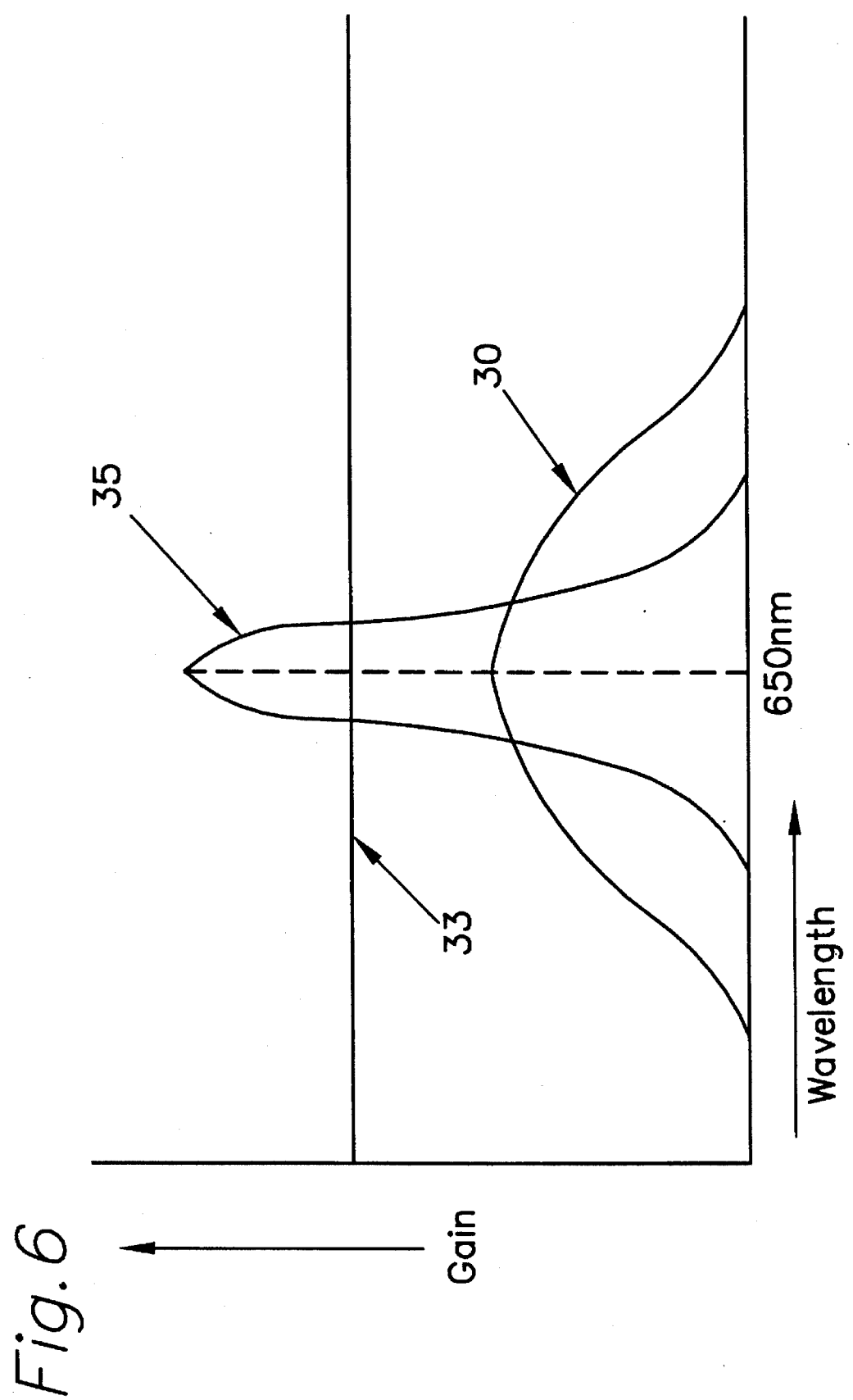
FIG. 6 shows a graph displaying the effect the magnetic fields created by the magnets have on the lasing of the ring laser gyro.

In FIG. 6, operation of the RLG with the magnets 30 and without the magnets 35 is shown. The horizontal line 33 depicts the point of cavity loss. The area under the curves 30 and 35 is the integrated gain. A set number of atoms in excited states exists when lasing occurs in an RLG. As a result, the population of atoms remains the same. In other words, the total gain is fixed. Since the gain remains the same, the area under the curves 30 and 35 must remain the same. When the wavelength range is broadened by the magnetic field created by the magnets 12, the height of the curve must go down. In the preferred embodiment, the gain at 650 nm is reduced such that it does not exceed cavity loss 33. In essence, the magnets 12 suppress lasing at the wavelength of 650 nm.

The embodiments of the invention in which an exclusive property or right is claimed are defined as follows:

1. Means to control a lasing operation at specific wavelengths in a ring laser gyro which comprises:

a ring laser gyro block;

an interior gain bore within the ring laser gyro block having a plurality of sides and a plurality of ends and containing gain medium;

a plurality of mirrors positioned at the ends of the interior gain bore to allow laser beams to reflect and perform the lasing operation;

a plurality of electrodes positioned at the sides of the ring laser gyro block for generating counterpropagating laser beams within the interior gain bore in which a current flows through the electrodes to the interior gain bore to create gain legs; and magnetic device in proximity to the gain legs that suppresses the lasing operation at the specific wavelengths by creating a inhomogenous magnetic field.

2. The magnetic device of claim 1 wherein the magnetic device comprises of a plurality of magnets.

3. The magnetic device of claim 2 wherein the magnetic device comprises of two magnets.

4. The magnetic device of claim 3 wherein a first magnet is positioned on a first side of the ring laser gyro where one electrode is positioned and a second magnet is positioned on a second side of the ring laser gyro where an other electrode is positioned.

5. The magnetic device of claim 3 wherein the first magnet is positioned on top of the ring laser gyro in proximity to the one electrode positioned on the first side of the ring laser gyro and the second magnet is positioned on top of the ring laser gyro in proximity to the other electrode positioned on the second side of the ring laser gyro.

6. The magnetic device of claim 3 wherein the two magnets are positioned at the third side of the ring laser gyro in proximity to where a third electrode is positioned.

7. The magnetic device of claim 3 wherein holes are bored in the ring laser gyro block parallel and in close proximity to the electrodes on both the first and second side of the ring laser gyro.

8. The magnetic device of claim 7 wherein magnets are placed in the holes bored in the ring laser gyro block.

9. The magnetic device of claim 3 wherein two holes are bored in the ring laser gyro block in proximity to the third electrode with one hole bored left of the third electrode and one hole bored right of the third electrode.

10. The magnetic device of claim 9 wherein magnets are placed in the holes bored in the ring laser gyro block.

\* \* \* \* \*